United States Patent [19]

Tadokoro et al.

[11] Patent Number: 4,908,809
[45] Date of Patent: Mar. 13, 1990

[54] INFORMATION-CARRYING MEDIUM EQUIPMENT FOR MAGNETO-OPTIC READING AND WRITING

[75] Inventors: Michihiro Tadokoro; Kazuo Okada, both of Amagasaki, Japan

[73] Assignee: Mitsubishi Denki Kabushiki Kaisha, Tokyo, Japan

[21] Appl. No.: 196,556

[22] Filed: May 20, 1988

[30] Foreign Application Priority Data

May 21, 1987 [JP] Japan .................................. 62-126668

[51] Int. Cl.⁴ ........................ G11B 13/04; G11B 11/12
[52] U.S. Cl. ....................................... 369/13; 360/59; 360/131; 365/122
[58] Field of Search ..................... 369/13; 360/59, 114, 360/131, 135; 365/122

[56] References Cited

U.S. PATENT DOCUMENTS

| | | | |
|---|---|---|---|
| 4,612,587 | 9/1986 | Kaneko et al. | 360/59 |
| 4,645,722 | 2/1987 | Katayama et al. | 360/131 |
| 4,649,519 | 3/1987 | Sun et al. | 365/122 |
| 4,701,881 | 10/1987 | Tanaka et al. | 365/122 |
| 4,771,347 | 9/1988 | Horimai et al. | 360/59 |
| 4,794,560 | 12/1988 | Bell et al. | 365/122 |

FOREIGN PATENT DOCUMENTS

| | | |
|---|---|---|
| 0217067 | 4/1987 | European Pat. Off. . |
| 0258978 | 3/1988 | European Pat. Off. . |
| 0285241 | 10/1988 | European Pat. Off. . |
| 2546655 | 10/1984 | France . |
| 61-11977 | 1/1986 | Japan ..................................... 369/13 |

OTHER PUBLICATIONS

Kobayashi et al., "Magnetization Process of Exchange-Coupled Ferrimagnetic Double-Layered Films", Japanese Journal of Applied Physics, vol. 20, No. 11, Nov. 1981, pp. 2089-2095.

Cohen, C. L. "Magneto-Optic Memories Begin To Look Like A Good Bet", Electronics, vol. 60, No. 8, Apr. 16, 1987, p. 33.

"Single Beam Over Write Method Using Multilayered Magneto Optical Media," 28p-ZL-3, Extended Abstracts (The 34th Spring Meeting 1987); The Japan Society of Applied Physics and Related Societies; 3-2-8-87.

Primary Examiner—Steven L. Stephan
Assistant Examiner—Hoa T. Nguyen
Attorney, Agent, or Firm—Fleit, Jacobson, Cohn, Price, Holman & Stern

[57] ABSTRACT

An information-carrying medium with first, second and third ferromagnetic layers is enclosed in a housing, in which an initializing magnet is disposed. The second layer of the information-carrying medium is magnetized by the initializing magnet premagnetized in a uniform direction and is used as a bias layer.

5 Claims, 6 Drawing Sheets

NEW DATA | OLD DATA

NEW DATA | OLD DATA

NEW DATA | OLD DATA

NEW DATA | OLD DATA

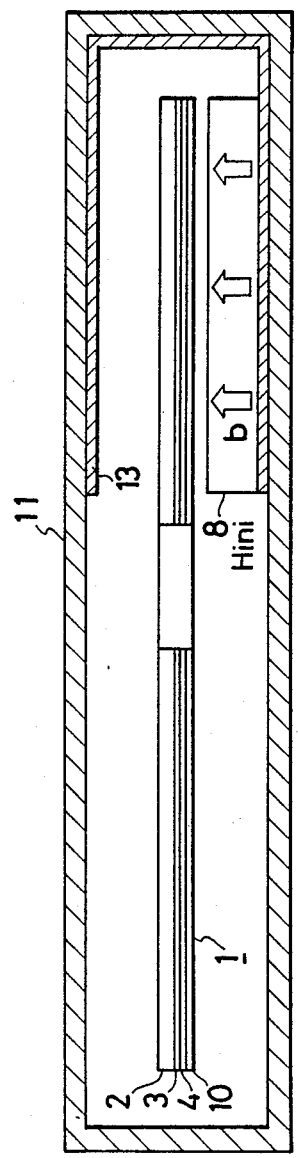

NEW DATA | OLD DATA

NEW DATA        OLD DATA

INFORMATION-CARRYING MEDIUM EQUIPMENT FOR MAGNETO-OPTIC READING AND WRITING

BACKGROUND OF THE INVENTION

This invention relates to information-carrying medium equipment for magneto-optic reading and writing that enables direct overwriting of new information on old information.

FIGS. 5A and 5B illustrate the principle of the prior art of magneto-optic information reading and writing as shown in the Extended Abstracts (The 34th Spring Meeting, 1987); The Japan Society of Applied Physics and Related Societies, 28p-ZL-3. FIG. 5A shows an oblique view; FIG. 5B is a cross-sectional view showing the main parts. The apparatus in these drawings comprises a magneto-optic information-carrying medium 1, which in turn comprises a glass or plastic substrate 2 and two ferromagnetic layers: a first layer 3 and a second layer 4. The apparatus also comprises an objective lens 5 for focusing a laser beam onto the information-carrying medium 1, where it forms a focused spot 6. 7 designates regions in the first layer 3 in which the magnetic alignment points upward in FIG. 5B, which represents binary data "1". The apparatus also comprises two magnets: an initializing magnet 8 for creating an initial magnetic alignment in the second layer 4; and a bias magnet 9 located opposite the objective lens 5 on the other side of the information-carrying medium 1.

This apparatus operates as follows. A support and drive mechanism not shown in the drawings turns the information-carrying medium 1 in a fixed direction (indicated as direction a). The essential components of the information-carrying medium 1 are those noted previously: a glass or plastic substrate 2 and two ferromagnetic layers, a first layer 3 and a second layer 4. The first layer 3, which is illuminated by the laser beam, has properties similar to those of the recording layer of the information-carrying media used in ordinary magneto-optic discs, and also operates as a recording layer in the apparatus under discussion. The second layer 4, called the supplementary layer, is provided to enable overwriting; that is, to enable new data to be written over old data directly. Let Tc1 and Tc2 be the Curie temperatures of the first layer 3 and second layer 4 respectively, and let Hc1 and Hc2 be the coercive forces of first layer 3 and second layer 4. These parameters of the two layers satisfy the following relationships:

$Tc1 < Tc2$ $Hc1 > Hc2.$

Let us first consider the reading of information recorded in the recording layer, namely the first layer 3. The objective lens 5 is driven by a driving mechanism not shown in the drawings in the direction of its optic axis and in a direction perpendicular to its optic axis (the radial direction of the information-carrying medium) so as to keep the spot 6 focused on the recording layer and followed on an information-carrying track.

As shown in FIG. 5B, the recording layer is magnetized parallel to its thickness direction. The magnetic alignment is either up or down in the drawing, these two directions corresponding to the "0" and "1" of a binary code. Magnetization in the up direction in the drawing represents a binary "1". When the information is read, the spot 6 is focused onto the first layer 3. The magnetic alignment of the first layer 3 is converted to optical information through a well-known magneto-optic effect (such as the Kerr effect); thus the information on the information-carrying medium 1 is detected. The intensity of the laser beam on the information-carrying medium 1 in this read operation is equivalent to intensity a in FIG. 6. At this intensity the regions of the first layer 3 and second layer 4 illuminated by the focused spot 6 do not reach their Curie temperature Tc1 or Tc2, so the focused spot 6 does not erase the recorded information by destroying the magnetic alignment.

Information is overwritten as follows. The initializing magnet 8 in FIGS. 5A and 5B applies an external field Hini (indicated by arrow b in the drawing) to the information-carrying medium 1. The external field is related to the coercive forces of the first layer 3 and second layer 4 as follows:

$Hini < Hc1$ $Hini > Hc1.$

As the information-carrying medium 1 rotates in direction a in FIG. 5B, when the second layer 4 passes over the initializing magnet 8 it is uniformly magnetized in the up direction, regardless of the magnetic alignment of the first layer 3. At room temperature the first layer 3 retains its existing magnetic alignment, being unaffected by the magnetic field generated by the initializing magnet 8 or the magnetic field generated by the magnetization of the second layer 4.

To write the information "1," that is, to magnetize the first layer 3 in the up direction, the laser beam is modulated to an intensity equivalent to b in FIG. 6. The temperature of the region of the first layer 3 where the spot 6 is focused by the objective lens 5 then rises until it exceeds the Curie temperature Tc1 of the first layer 3, destroying the magnetic alignment of the first layer 3. The second layer 4, however, remains below its Curie temperature Tc2, so it retains the upward magnetic alignment given it by the initializing magnet 8. When the portion of the first layer 3 illuminated by the focused spot 6 cools, it therefore acquires the upward magnetic alignment of the second layer 4.

To write the information "0," that is, to magnetize the first layer 3 in the down direction, the laser beam is modulated to an intensity equivalent to c in FIG. 6. In this case the temperature in the region illuminated by the focused spot 6 rises until it exceeds the Curie temperature in the first layer 3 (Tc1) and the second layer 4 (Tc2), causing both layers to lose their magnetic alignment. Due to a weak external magnetic field Hb generated by the bias magnet 9 located opposite the objective lens 5 on the other side of the information-carrying medium 1, however, the second layer 4 is remagnetized in the direction of the field Hb, namely the down direction. When the first layer 3 cools, it acquires the downward magnetic alignment of the second layer 4. In this way the first layer 3 is magnetized in the down direction. The intensity of the external bias field Hb is weak but within the range consistent with the above operation.

The operations described above enable new information to be overwritten in real time on old information by modulation of the laser beam between intensities b and c in FIG. 6, which write the binary codes "1" and "0".

When the magneto-optic information-carrying medium is structured as in the prior art described above, however, the initializing magnet must be located external to the housing of the information-carrying medium, in a space in the optical reading and writing apparatus. Consequently, the optical reading and writing apparatus must be complex in structure and large in size.

SUMMARY OF THE INVENTION

An object of this invention is to solve this problem by providing information-carrying medium equipment for magneto-optic reading and writing that is simple and compact.

According to the invention, there is provided information-carrying medium equipment for magneto-optic reading and writing, comprising:

an information-carrying medium having a first layer, a second layer, and a third layer magnetized in a uniform direction parallel to the thickness of the layer, wherein these layers are stacked on a substrate in the above order as seen from the side illuminated by a laser beam, the Curie temperature of the second layer is higher than the Curie temperature of the first layer but lower than the Curie temperature of the third layer, and the coercive force of the second layer is less than the coercive forces of the first layer and the third layer:

a housing for the information-carrying medium; and magnetizing means disposed in the housing facing the information-carrying medium, for initializing the direction of magnetization of the second layer of the information-carrying medium in a designated direction.

In this invention the bias magnetic field is generated by a third layer in the information-carrying medium, and the second layer is initialized by an initializing magnet built into the housing of the information-carrying medium, so the invention can yield a simple structure and a simple, compact optical reading and writing apparatus.

BRIEF DESCRIPTION OF THE DRAWINGS

FIG. 3 is a partial cross-sectional drawing showing a third embodiment of this invention.

DETAILED DESCRIPTION OF THE PREFERRED EMBODIMENT

Figure 1A:
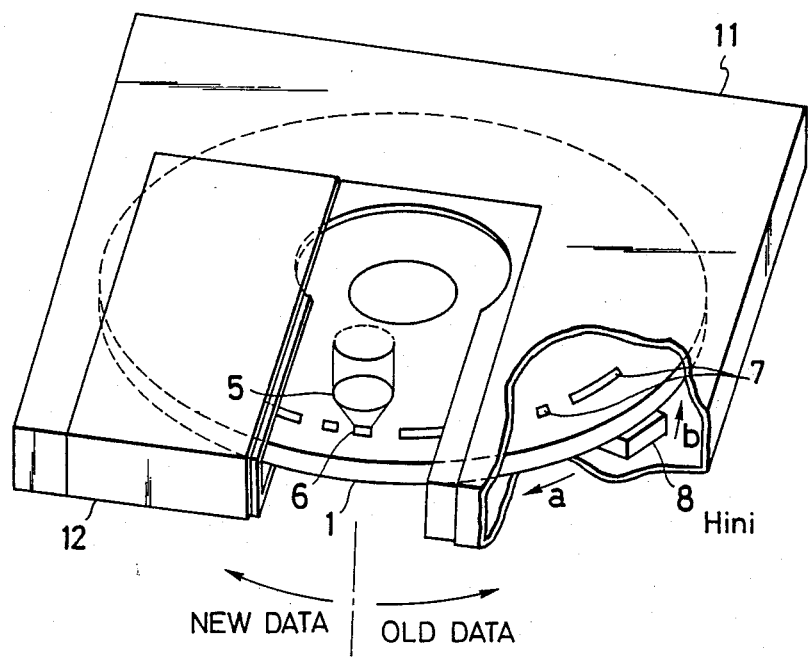
FIG. 1A is an oblique view of a first embodiment of the present invention showing how the invention is used.

An embodiment of this invention will be described with reference to the drawings. Elements 1 through 8 in FIG. 1A are the same as in the prior art. Element 10 is a third layer of ferromagnetic material. The information-carrying medium 1 basically comprises a substrate 2 and three ferromagnetic layers 3, 4, and 10. Element 11 is a housing that encloses the information-carrying medium 1; in the drawing the housing is partly cut away. The initializing magnet 8 is built into the housing 11 of the information-carrying medium. Element 12 is a shutter which is mounted on the housing 11 so that it is free to slide, and is opened when the information-carrying medium 1 is used.

This embodiment operates as follows. The information-carrying medium 1 is rotated in the direction of the arrow a in the drawing. The three ferromagnetic layers of the information-carrying medium 1 are stacked so that, as seen from the side on which the laser beam is incident, the first layer 3 is on top, the second layer 4 is in the middle, and the third layer 10 is at the bottom. Here, for example, each ferromagnetic layer possesses an axis of easy magnetization extending in the thickness direction of the layer. The first layer 3 possesses the same properties as the recording layer in the information-carrying media used in ordinary magneto-optic discs. Information is recorded in this layer. The second layer 4 and third layer 10, which are called supplementary layers, are provided to enable overwriting. Let Tc1, Tc2, and Tc3 be the Curie temperature of the first layer 3, the second layer 4, and the third layer 10 respectively, and let Hc1, Hc2, and Hc3 be the coercive force of the first layer 3, the second layer 4, and the third layer 10. These parameters of the three layers satisfy the following relationships:

$Tc1 < Tc2 < Tc3$ $Hc1 > Hc3 > Hc2,$ or $Hc1 > Hc2$ and $Hc3 > Hc2.$

Figure 1B:
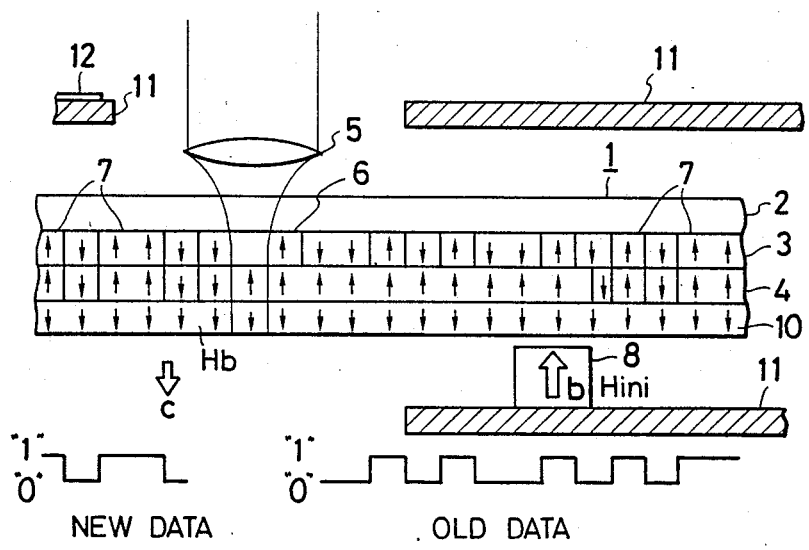
FIG. 1B is a cross-sectional drawing of the first embodiment indicating how information is written.

The third layer 10 is uniformly premagnetized in the down direction (the direction of arrow c in FIG. 1B). The magnetic field Hb resulting from the magnetization of the third layer 10 is too weak to affect the magnetic alignment of the first layer 3 and second layer 4 at room temperature.

Information recorded in the recording layer (the first layer 3) is read as follows. The objective lens 5 is driven as in the prior art to keep a spot 6 focused on the recording surface and followed on an information track. Information is then read from the information-carrying medium 1 by detecting the direction of magnetic alignment (parallel to the thickness of the layer; up or down in the drawing) of the first layer 3 by means of a magneto-optic effect. The intensity of the laser beam when information is read is equivalent to intensity a in FIG. 6. At this intensity the regions of the first layer 3, the second layer 4, and the third layer 10 illuminated by the focused spot 6 do not reach their Curie temperature Tc1, Tc2, or Tc3 so the focused spot 6 does not erase the recorded information by destroying the magnetic alignment.

Information is overwritten as follows.

The initializing magnet 8 in FIG. 1B, which is built into the housing 11 as already described, applies an external field Hini (indicated by arrow b in the drawing).

The external field Hini is related to the coercive forces of the first layer 3, the second layer 4, and the third layer 10 as follows:

$Hini < Hc1$ $Hini > Hc2$ $Hini < Hc3$.

As the information-carrying medium 1 rotates in direction a in FIG. 1B, when the second layer 4 passes over the initializing magnet 8 it is uniformly magnetized in the up direction in the drawing, regardless of the magnetic alignment of the first layer 3 and the third layer 10. The magnetic field generated by the second layer 4 is weaker than the coercive force Hc1 of the first layer 3 and the coercive force Hc3 of the third layer 10, so at room temperature it does not affect the magnetic alignment of the first layer 3 and the third layer 10.

Figure 6:
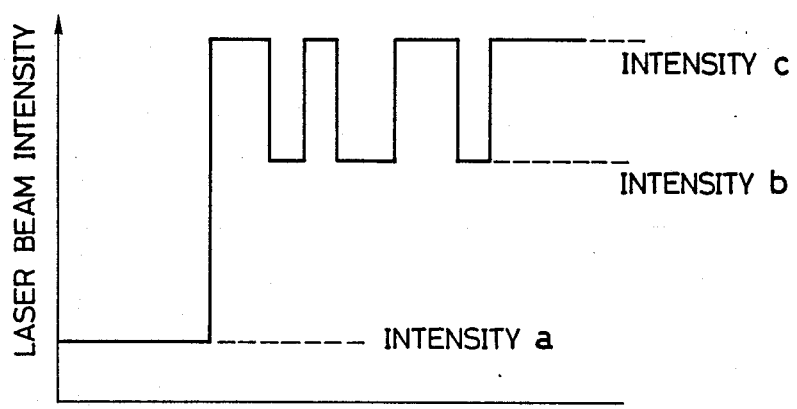
FIG. 6 indicates the intensity modulation of the laser beam.

To write the information "1," that is, to magnetize the first layer 3 in the up direction, the laser beam is modulated to an intensity equivalent to b in FIG. 6. The temperature of the region of the first layer 3 where the spot 6 is focused by the objective lens 5 then rises until it exceeds the Curie temperature Tc1 of the first layer 3, destroying the magnetic alignment of the first layer 3. The second layer 4 and the third layer 10, however, remain below their Curie temperatures Tc2 and Tc3, so the second layer 4 retains the upward magnetic alignment given it by the initializing magnet 8 and the third layer 10 retains its original down alignment.

The first layer 3 is subject to the magnetic fields generated by both the second layer 4 and the third layer 10, but as stated previously, the magnetic field Hb of the third layer 10, which is aligned in the downward direction of the arrow c, is weak; the magnetic field of the second layer 4, which is aligned in the upward direction of the arrow b, has a stronger effect on the first layer 3. When the portion of the first layer 3 which was illuminated by the focused spot 6 and raised above its Curie temperature Tc1 cools, it therefore acquires the magnetic alignment of the second layer 4. The result is that the first layer 3 is magnetized in the up direction.

To write the information "0," that is, to magnetize the first layer 3 in the down direction, the laser beam is modulated to an intensity equivalent to c in FIG. 6. Due to the higher beam intensity, in this case the temperature in the region illuminated by the focused spot 6 rises until it exceeds the Curie temperature in the first layer 3 (Tc1) and the second layer (Tc2), causing both the first layer 3 and the second layer 4 to lose their magnetic alignment in the region illuminated by the focused spot 6. The temperature of the third layer 10 in the region illuminated by the focused spot 6, however, does not reach the Curie temperature Tc3 of that layer, so it retains its magnetic field Hb. The second layer 4 is therefore remagnetized in the down direction by the magnetic field Hb of layer 10. When the first layer 3 cools, it acquires the downward magnetic alignment of the second layer 4. As a result the first layer 3 is magnetized in the down direction.

To summarize the above explanation:

[1] After the Curie temperature Tc1 is exceeded, the magnetic alignment of the second layer 4 is transferred to the first layer 3.

[2] At room temperature, the second layer 4 is uniformly magnetized in the up direction by the magnetic field Hini of the initializing magnet 8, regardless of the magnetic alignment of the first layer 3 and the third layer 10.

[3] After the Curie temperature Tc2 is exceeded, the magnetic field Hb of the third layer 10 magnetizes the second layer 4 in the down direction.

Information can thus be overwritten in the manner explained above by modulating the intensity of the laser beam between intensities b and c in FIG. 6.

The provision of a third layer 10 in the information-carrying medium 1 of this invention and its uniform premagnetization in the down direction as described above not only ensures that the effect of the bias magnetic field Hb on the second layer 4 is constant; it also eliminates the need for an external bias magnet 9 as in the prior art. The optical reading and writing apparatus can therefore be small in size and simple in structure, without the complexity of the configuration in which a bias magnet 9 is mounted in a position opposite the objective lens 5.

Furthermore, since the initializing magnet 8 is built into the housing 11 of the information-carrying medium in this invention, there is no need to mount an initializing magnet inside the optical reading and writing apparatus. This gives a simple, uncomplicated structure and a compact optical reading and writing apparatus.

Figure 2A:
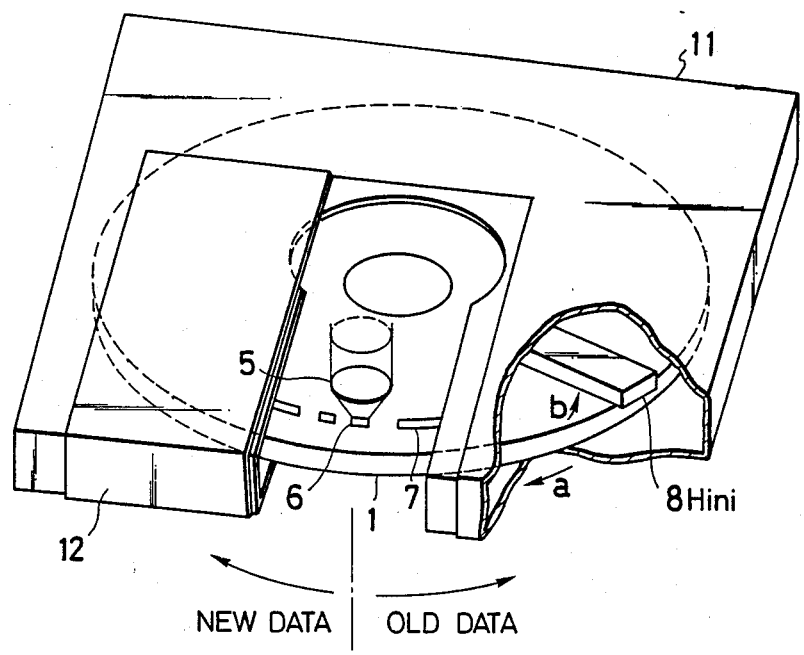
FIG. 2A is an oblique view of a second embodiment of the present invention showing how the invention is used.
Figure 2B:
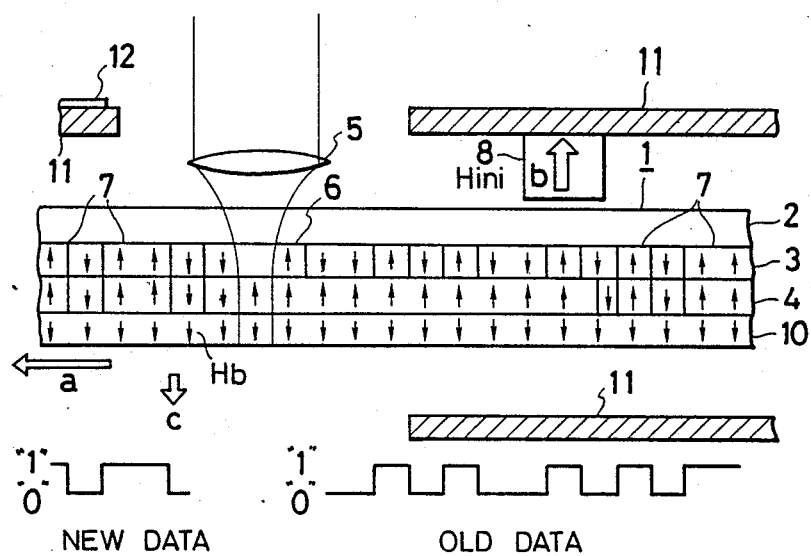
FIG. 2B is a cross-sectional drawing of the second embodiment indicating how information is written.

A second embodiment of this invention is shown in FIGS. 2A and 2B. In this embodiment the initializing magnet 8 is built into the housing 11 on the same side of the information-carrying medium 1 as the objective lens 5. This enables the apparatus to be made similarly compact.

A third embodiment of this invention is shown in FIG. 3, which gives a cross-sectional view of the main parts of the housing 11. In this drawing the numeral 13 denotes a U-shaped yoke of a magnetic material. The yoke 13 is attached to the inside of the housing 11 as shown in the drawing, and the initializing magnet 8 is attached to the yoke 13. The initializing magnet 8 and yoke 13 form a closed magnetic loop. The information-carrying medium 1 is located in the gap of this closed magnetic loop.

This configuration not only yields a simple, compact structure, but also increases and stabilizes the effect of the magnetic field Hini produced by the initializing magnet 8.

Figure 4:
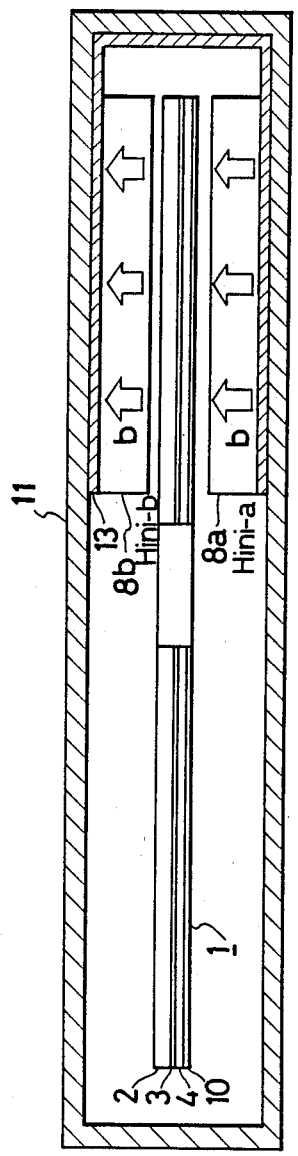
FIG. 4 is a partial cross-sectional drawing showing a fourth embodiment of this invention.
Figure 5A:
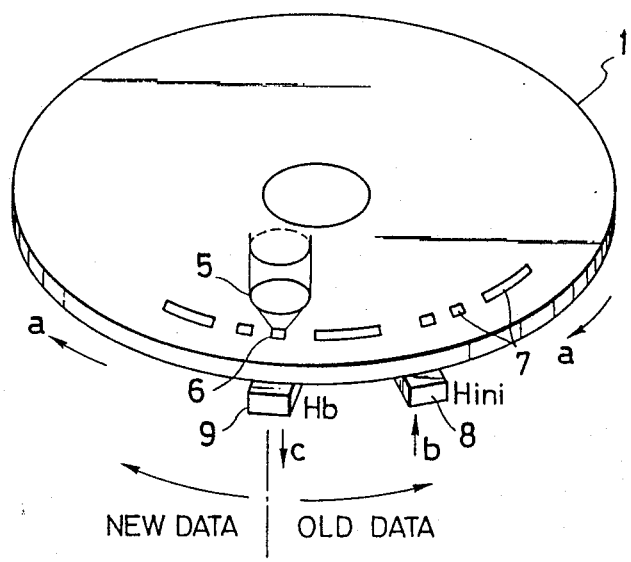
FIG. 5A is an oblique view of prior art showing how the prior art is used.
Figure 5B:
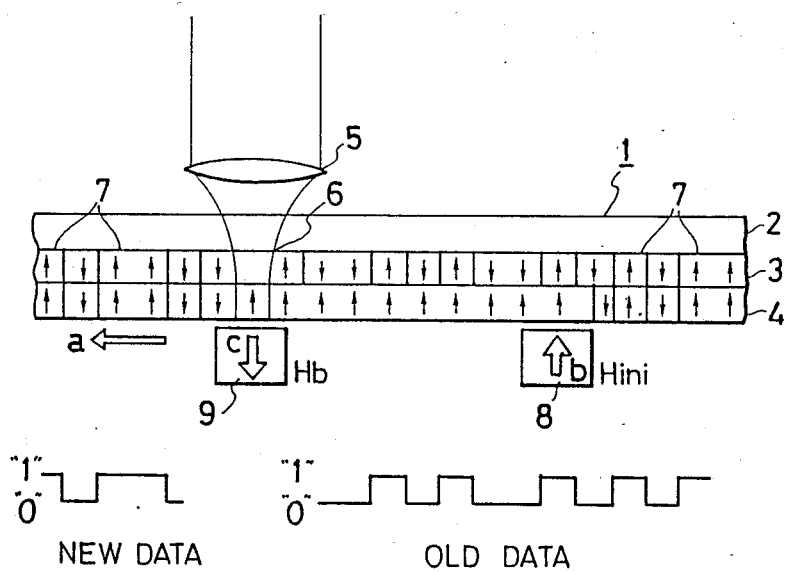
FIG. 5B is a cross-sectional drawing of prior art indicating how information is written.

A fourth embodiment of this invention is shown in FIG. 4, in which the information-carrying medium 1 is located between two initializing magnets 8a and 8b. This configuration similarly yields a simple, compact structure and increases and stabilizes the effect of the magnetic field Hini.

In the above embodiments the initial magnetic field Hini pointed up and the bias magnetic field Hb pointed down, but the opposite arrangement, in which Hini points down and Hb points up, is also possible. The effect of the invention remains the same.

What is claimed is:

1. An information-carrying medium equipment for magneto-optic reading and writing, comprising:
   an information-carrying medium having, in order, a first magnetic recording layer having a Curie temperature Tc1 and a coercive force Hc1, a second magnetic layer having a Curie temperature Tc2 and a coercive force Hc2, a third magnetic layer having a Curie temperature Tc3 and a coercive force Hc3, the third magnetic layer is premagnetized in a uniform direction parallel to the thickness of said third layer for use as a biasing layer, wherein said first, second and third magnetic layers are stacked on a substrate in the above order and said medium is illuminated by a laser beam through said substrate, the Curie temperature Tc2 is higher than the Curie temperature Tc1 but lower than the Curie temperature Tc3, and the coercive force Hc2 is less than the coercive forces Hc1 and Hc3;

a housing for the information-carrying medium; and magnetizing means disposed in the housing facing the information-carrying medium, for initializing the direction of magnetization of the second magnetic layer of the information-carrying medium in a designated direction.

2. Information-carrying medium equipment for magneto-optic reading and writing according to claim 1, wherein the magnetizing means comprises an initializing magnet confronting with the third layer.

3. Information-carrying medium equipment for magneto-optic reading and writing according to claim 1, wherein the magnetizing means comprises an initializing magnet confronting with the substrate.

4. Information-carrying medium equipment for magneto-optic reading and writing according to claim 1, wherein the magnetizing means comprises a U-shaped yoke disposed on both sides of the information-carrying medium and an initializing magnet attached to this yoke facing the information-carrying medium.

5. Information-carrying medium equipment for magneto-optic reading and writing according to claim 1, wherein the magnetizing means comprises a U-shaped yoke disposed on both sides of the information-carrying medium and two initializing magnets attached to this yoke facing the information-carrying medium.

* * * * *